US 6,559,397 B1

(12) United States Patent
Beaston

(10) Patent No.: US 6,559,397 B1
(45) Date of Patent: May 6, 2003

(54) DISHWASHER FLOAT RETAINER FOR DISHWASHER FLOAT SWITCH ASSEMBLY

(75) Inventor: Brook J. Beaston, Jackson, TN (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/171,305

(22) Filed: Jun. 12, 2002

(51) Int. Cl.[7] .......................... H01H 35/18; G01F 23/56
(52) U.S. Cl. ...................... 200/84 R; 73/322.5; 73/305; 73/308
(58) Field of Search ............................ 200/84 R–84 C, 200/293–307; 137/387, 409–440; 73/305, 308, 322.5

(56) References Cited

U.S. PATENT DOCUMENTS

| 3,643,681 A | 2/1972 | Simmons |
| 3,721,783 A | 3/1973 | Hancock |
| 3,829,636 A | 8/1974 | Scott |
| 3,894,555 A | 7/1975 | Payne |
| 4,180,085 A | * 12/1979 | Berges et al. ............. 200/84 R |
| 4,180,095 A | 12/1979 | Woolley et al. |
| 4,256,136 A | * 3/1981 | Crawford .................... 137/387 |
| 4,289,154 A | 9/1981 | Quayle |
| 5,018,550 A | 5/1991 | Burdorff |
| 5,365,969 A | 11/1994 | Edwards |

* cited by examiner

Primary Examiner—J. R. Scott
(74) Attorney, Agent, or Firm—McKee, Voorhees & Sease, P.L.C.

(57) ABSTRACT

A float retainer is provided for a dishwasher to limit the level of water in the dishwasher tub. The float has a stem extending downwardly through a stand pipe in the bottom of the tub and into a switch bracket which houses the water level control switch. A tab is provided on the switch bracket which is adapted to snap fit around the float stem, thereby slidably retaining the retainer ring of the stem for engagement and disengagement with the switch.

15 Claims, 4 Drawing Sheets

DISHWASHER FLOAT RETAINER FOR DISHWASHER FLOAT SWITCH ASSEMBLY

BACKGROUND OF THE INVENTION

Dishwashers generally include a float in the bottom of the tub which is adapted to actuate a switch to control the water level in the tub. The float includes a stem extending through the tub for engaging and disengaging with an actuator arm on the switch, which resides outside of the tub. Typically a nut is threaded onto the end of the float stem to retain the stem in position outside the tub. Since the stem is in a small or tight location, assembly of the nut onto the stem is a difficult and time consuming assembly task.

Accordingly, a primary objective of the present invention is the provision of an improved float retainer for a dishwasher float.

Another objective of the present invention is the provision of an improved switch bracket with a float retainer for controlling the water level in an appliance.

Another objective of the present invention is the provision of a method of retaining a float in a dishwasher tub so as to control the water level in the tub.

Still another objective of the present invention is the provision of a dishwasher float retainer having a snap fit tab for quickly and easily retaining the float stem.

A further objective of the present invention is the provision of a dishwasher float retainer which is economical to manufacture and easy to install.

These and other objectives will become apparent from the following description of the invention.

SUMMARY OF THE INVENTION

An improved float retainer is provided for a dishwasher. The float retainer is integrally formed as a component of the float switch bracket mounted on the bottom of the tub of the dishwasher. The float retainer comprises a collar on the switch bracket which defines a passage way through which the float stem extends, with opposite upper and lower ends. A tab is hinged to the lower end of the collar, and has an opening through which the stem fits so as to slidably retain the stem in the tab.

The method of retaining the float in the dishwasher tub for controlling the water level in the tub includes the steps of positioning the float in the tub, inserting the stem of the float through a stand pipe in the tub for receipt in the switch bracket mounted beneath the tub, and snap fitting a tab on the switch bracket around the stem so that the stem is slidably retained by the tab and in the stand pipe. Thus, the float is initially in a lower. position wherein the stem engages the switch actuation arm, and is free to rise as the water level of the tub rises, until the stem disengages the switch actuation arm.

DETAILED DESCRIPTION OF THE INVENTION

Figure 1:
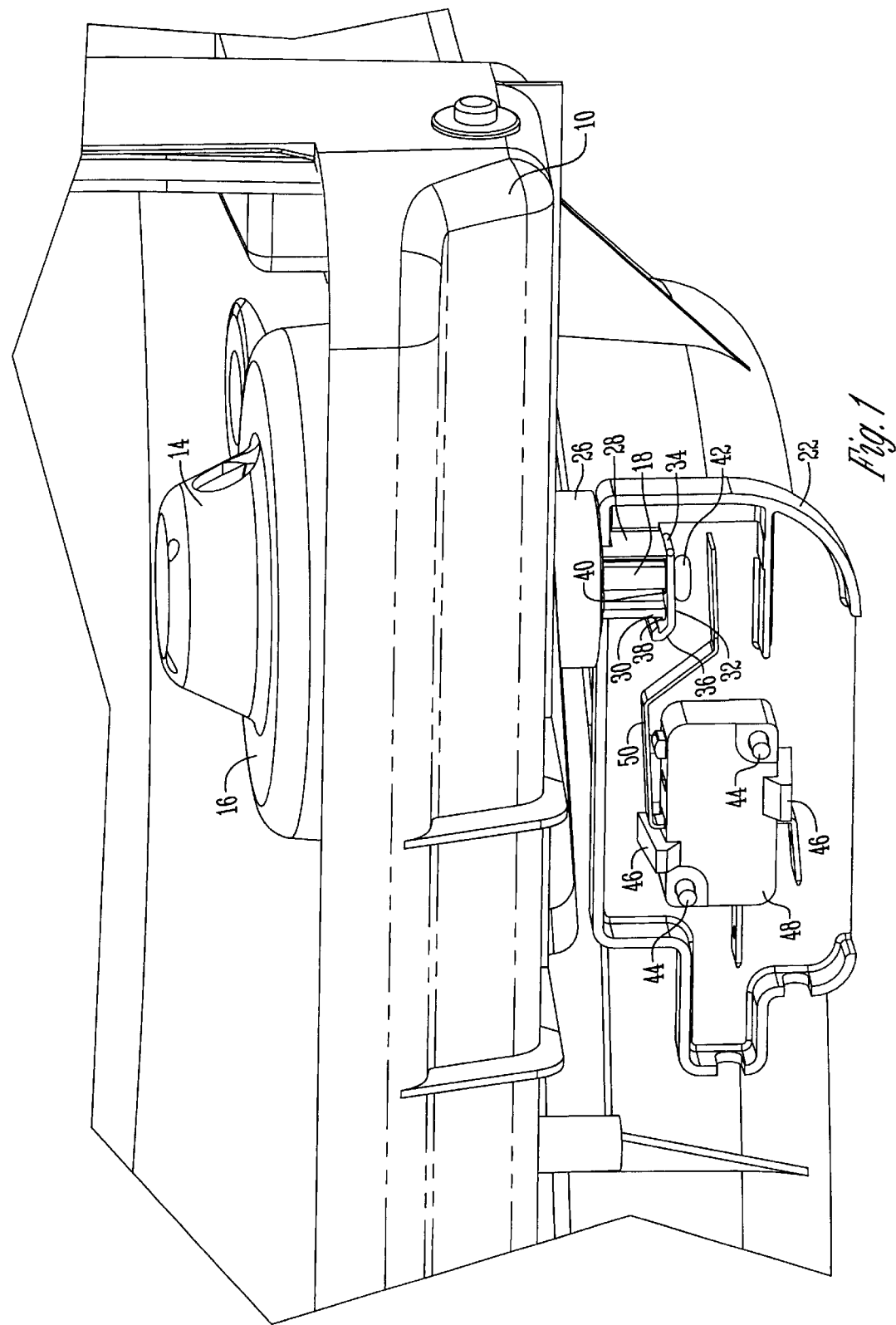
FIG. 1 is a perspective view showing the dishwasher float retainer of the present invention mounted on the bottom of the tub with the stem of the float retained therein.
Figure 2:
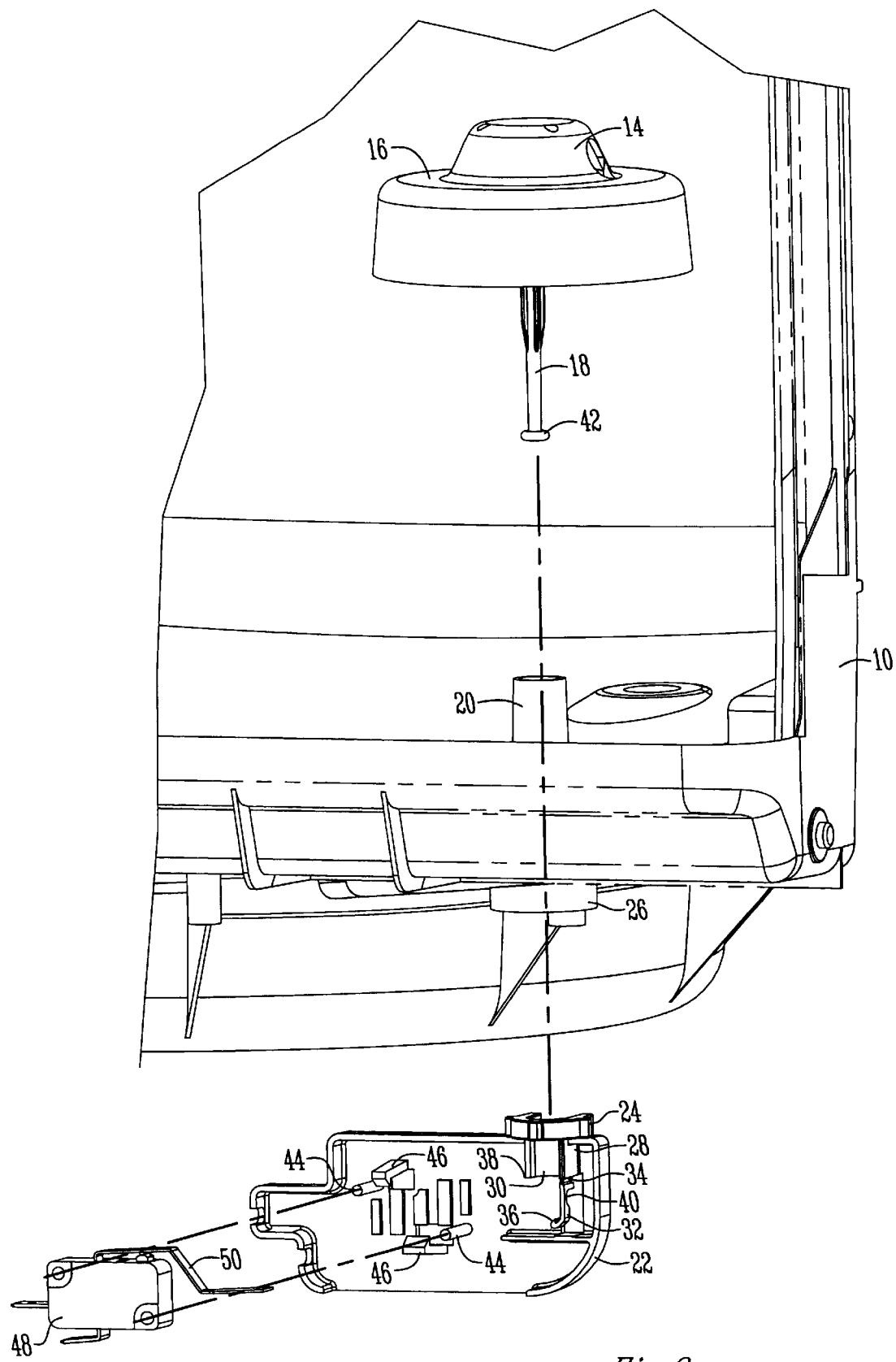
FIG. 2 is an exploded perspective view of the float retainer and float of the present invention.

A dishwasher tub is generally designated in the drawings by the reference numeral 10. The tub 10 has a bottom wall 12 in which is mounted a float 14 to control the water level in the tub 10.

The float 14 includes a body 16 with a stem 18 extending downwardly from the body 16. The stem 18 extends downwardly through a stand pipe 20 formed in the bottom 12 of the tub 10. The upper end of the stand pipe 20 resides above the water level in the tub 10, so as to preclude water from draining through the stand pipe 20.

Figure 5:
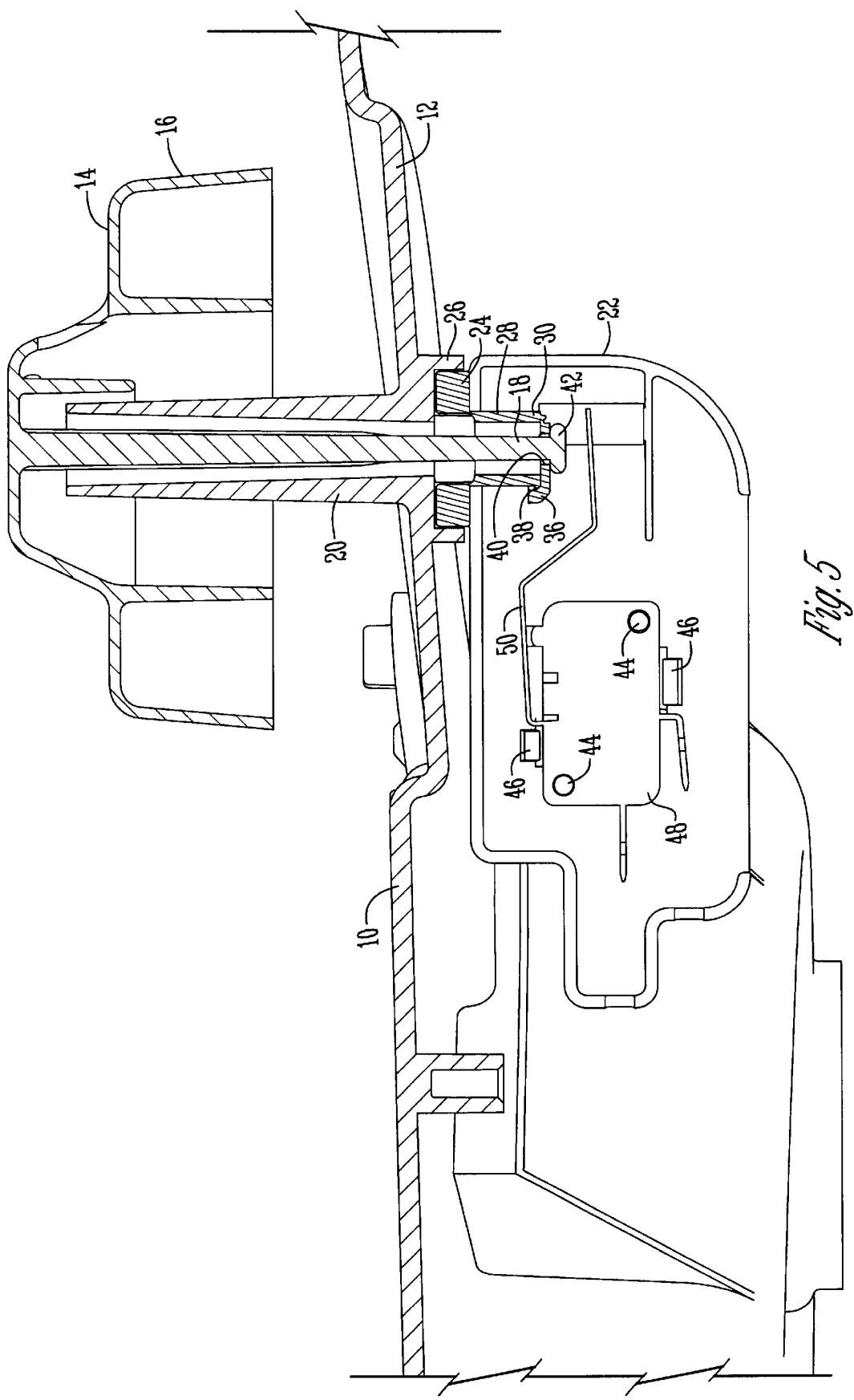
FIG. 5 is a sectional view of the float retainer with the float retained in position on the bottom of the tub of the dishwasher by the retainer tab.

A switch bracket or housing 22 is mounted.to the bottom 12 of the tub 10 in any convenient manner. For example, a mounting ring 24 formed on the top of the switch bracket 22 is press fit into a fitting 26 on the bottom 12 of the tub 10, as best seen in FIG. 5. A collar 28 extends downwardly from the switch bracket 22 and is axially aligned with the stand pipe 20. The collar 28 has a lower end 30.

Figure 3:
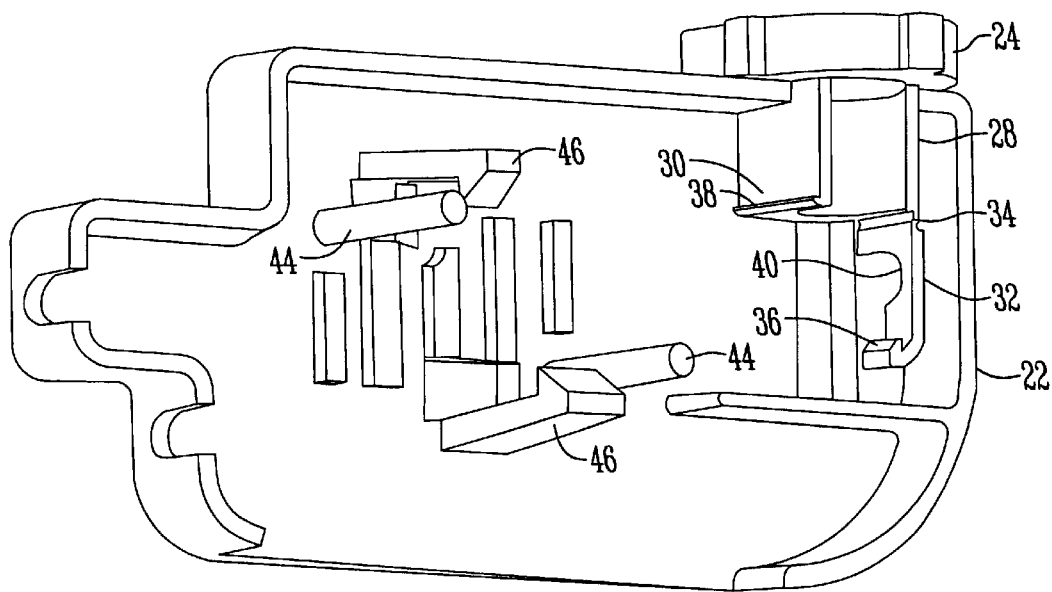
FIG. 3 is a perspective view of the float retainer with the retainer tab in an open position.
Figure 4:
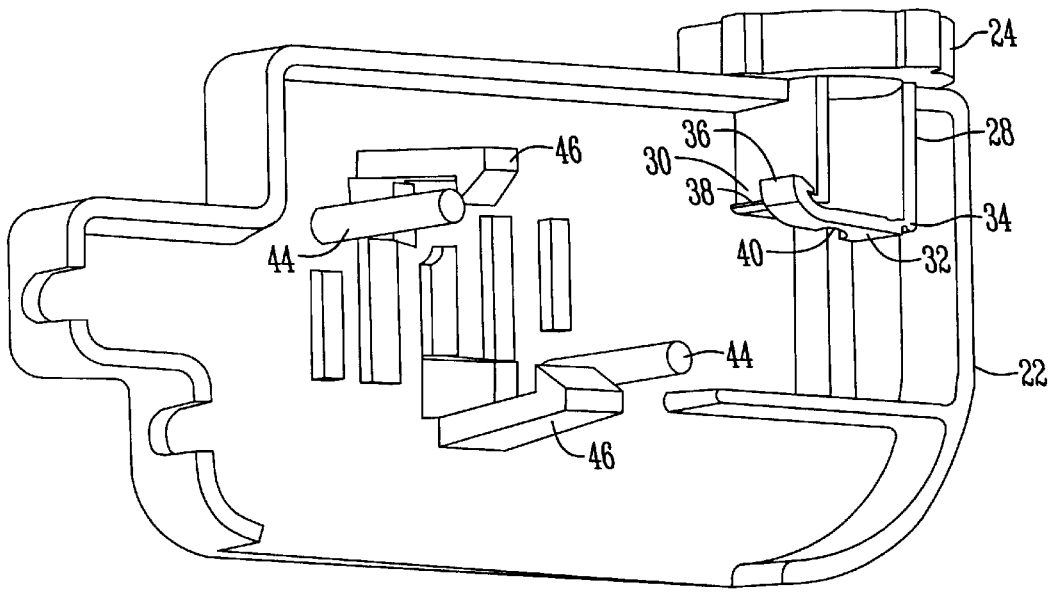
FIG. 4 is a perspective view of the float retainer with the retainer tab in a closed position.

A retainer tab 32 is provided on the lower end 30 of the collar 28, and is adapted to move between an open position, shown in FIG. 3, and a closed position, shown in FIG. 4. Preferably, the retainer tab 32 is integrally formed with the collar 28 so as to define a hinge 34.

The retainer tab 32 includes a hook 36 on the free end opposite the hinge 34. The hook 36 is adapted to snap fit onto a lip 38 on the collar 28. The retainer tab 32 also has an opening 40 through which the retainer ring 42 on the lower end of the float stem 38 extends. The retainer ring 42 has a diameter slightly larger than the opening 40 of the retainer tab 32, such that the retainer ring 42 cannot be disengaged from the retainer tab 32 by rising water in the tub 10, by tipping of the dishwasher, or by someone simply grabbing the float 14 by the body 16 and removing.

The switch bracket 22 also includes mounting pins 44 and retainer clips 46 for mounting and retaining a switch 48. The switch 48 includes an actuator arm or lever 50 which extends beneath the float stem 18, as best seen in FIG. 5. The actuator arm 50 is normally biased to a raised or upward position.

When there is no water in the tub 10, the float 14 will be in a lower position with the stem 18 depressing the actuator arm 50 of the switch 48, which allows water to be added to the tub 10. When the water reaches a predetermined level in the tub 10, the float 14 will rise sufficiently so that the stem 18 disengages the actuator arm 50 of the switch 48, such that the switch 48 is de-actuated.

In assembling the switch bracket 22 and float 14 according to the method of the present invention, the switch bracket 22 is mounted onto the bottom 12 of the tub 10. The stem 18 of the float 14 is then inserted into the stand pipe 20, and allowed to drop to a position wherein the retainer ring 42 is below the lower end 30 of the collar 28. The retainer tab 32 is then pivoted from the open position to the closed position so that opening 40 surrounds the stem 18, and the hook 36 of the retainer tab 32 is snap fit onto the lip 38 of the collar 28 to secure the tab 32 to the collar 28. The switch 48 is mounted over the pins 44 and secured by the clips 46, with the actuator arm 50 extending beneath the stem 18 of the float 14.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A float retainer for a dishwasher, the dishwasher including a tub, a float with a stem extending through a standpipe in the tub, the stem being adapted to engage and disengage a switch mounted in a switch bracket to control the water level in the tub, the float retainer comprising:

a collar on the switch bracket defining a passageway through which the float stem extends, and having upper and lower ends; and a tab on the lower end of the collar having an opening through which a lower end of the stem fits so as to slidably retain the stem in the tab.

2. The float retainer of claim 1 wherein the tab is hinged to the collar of the switch bracket.

3. The float retainer of claim 2 wherein the tab and collar are integrally formed.

4. The float retainer of claim 1 wherein the collar includes a lip and the tab is movable between an open position disengaged from the lip and a closed position engaged with the lip.

5. An improved switch bracket for housing a switch to control the water level in an appliance, the appliance having a float with a stem extending through a standpipe, the stem being adapted to engage and actuate the switch beneath the standpipe, the improvement comprising:

a tab on the switch bracket having an opening through which the stem fits to slidably retain the stem in the standpipe.

6. The improved switch bracket of claim 5 further comprising a collar having an open upper end and an open lower end, the tab being located adjacent the lower end of the collar.

7. The improved switch bracket of claim 6 wherein the tab and collar are integrally formed.

8. The improved switch bracket of claim 5 wherein the tab is formed integrally with the switch bracket.

9. The improved switch bracket of claim 5 wherein the tab is hinged to the switch bracket.

10. The improved switch bracket of claim 5 wherein the tab is movable between open and closed positions.

11. The improved switch bracket of claim 10 wherein the tab snap fits onto a lip on the switch bracket for retention in the closed position.

12. The improved switch bracket of claim 5 wherein the tab is pivotally connected to the switch bracket.

13. A method of retaining a float in a dishwasher tub for controlling the water level in the tub, comprising:

positioning the float in the tub;

inserting a stem of the float through a stand pipe in the tub for receipt in a switch bracket beneath the tub; and snap fitting a tab on the switch bracket around the stem for sliding retention of the float in the stand pipe.

14. The method of claim 13 wherein the tab is pivoted from a first position to a second position wherein the tab snap fits around the stem.

15. The method of claim 14 wherein the tab is retained in the second position by snap fitting onto a lip on the switch bracket.

* * * * *